Figure 1:
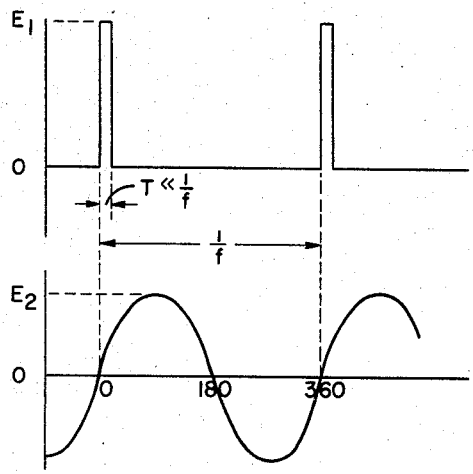

July 26, 1960   A. F. BOSCIA   2,946,953
PHASE DETECTORS
Filed Jan. 23, 1957

INVENTOR.
ARCHIE F. BOSCIA
BY
ATTORNEY

United States Patent Office 2,946,953
Patented July 26, 1960

2,946,953
PHASE DETECTORS

Archie F. Boscia, Rochester, N.Y., assignor to General Dynamics Corporation, Rochester, N.Y., a corporation of Delaware Filed Jan. 23, 1957, Ser. No. 635,900

5 Claims. (Cl. 324—87)

This invention relates to phase detectors and is particularly directed to means for precisely detecting, defining, and indicating or utilizing the phase of an alternating or undulatory wave with respect to a pulse wave of short duration and of a repetition rate equal to the alternating wave frequency.

Phase measurement is a problem that persists in much of the electrical art and has become particularly important in fields where the time phase of an alternating wave must be measured with respect to reference pulses of a like period. In television, for example, a locally generated sweep wave must be compared and synchronized with received synchronizing pulses. Or, in navigation where the asimuthal position of a ship or airplane is established by the space phase of a radio beam rotated at a fixed speed about a ground station, the reference compass direction, such as "north," being established by a short but powerful pulse each time the beam passes that reference direction. Again, in laboratory and industrial equipment it is often necessary to measure phase relations and to produce a voltage the amplitude of which is analogous to degrees, and the polarity of which is representative of lag or lead of one wave with respect to the other.

Phase detectors, heretofore, are usually of the "balanced" type. In automatic frequency control circuits for radio receivers, for example, the phase detector requires that either the pulse voltage or the alternating voltage be supplied in push-pull. That is, that equal amplitudes of opposite polarity must be made available. This usually results in considerable circuit complexity, and it is usually very difficult to establish signals which are of exactly equal amplitude and opposite polarity.

Peak-riding detectors are inaccurate, at best. Even with symmetrical sinusoidal waves, the technique of finding the highest point on the relatively flat crest of the lobes of the wave is crude. Little success has been had by differentiating and detecting the steepest portion of the wave at or near the nodal point of the wave.

The object of this invention is to provide improved means for detecting and defining the phase of an alternating wave.

A more specific object of this invention is to provide improved means for detecting the phase of an alternating wave with respect to a pulse signal with the same repetition frequency.

A still more specific object of this invention is to provide means for deriving a direct current voltage which is representative of the phase difference between a pulse and alternating wave, which voltage is zero when the pulses occur at zero amplitude of the alternating wave and which is either positive or negative when they do not occur at the zero amplitude point of the alternating wave depending on the direction of phase difference.

Still another object of this invention is to provide a simple single-ended phase detector for deriving a direct current voltage the amplitude of which is analogous to phase difference, and the polarity of which is representative of lag or lead of one wave with respect to another.

The objects of this invention are attained by sending one of the two waves to be compared through two parallel paths of equal impedance between the input and output terminal of the phase detector. In one path, the polarity of said one signal is reversed so that the signal in the two parallel paths add to zero at the output terminal. The other wave, the phase of which is to be determined with respect to the first wave, is applied to the other of the parallel paths to arithmetically add to the voltage of the first wave. There results at the output terminal a direct current voltage the amplitude and polarity of which comprises complete information concerning the phase relationship of the two waves.

Figure 2:
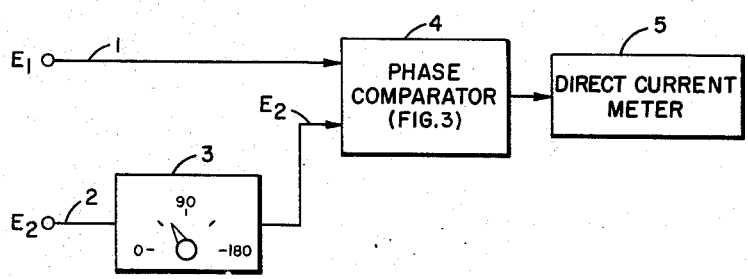
Figure 3:
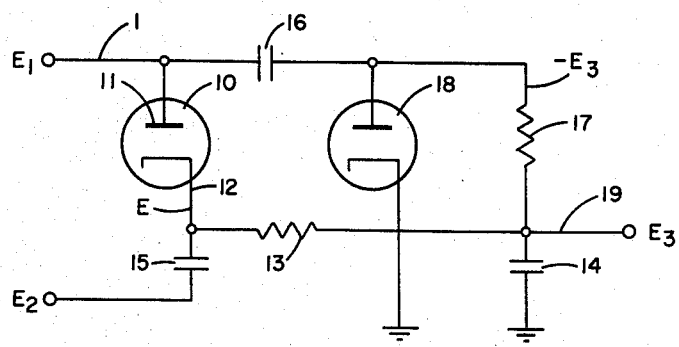

Other objects and features of this invention will become apparent to those skilled in the art by referring to the specific embodiment disclosed in the following specification and shown in the accompanying drawing in which:

Figure 1 is a graph of typical wave forms, the phases of which are to be compared, Figure 2 is a block diagram of one system embodying the detector of this invention, and Figure 3 is a circuit diagram of one phase detector of this invention.

Two waves the phase relationship of which is to be detected are shown in Figure 1. One wave is assumed to comprise a series of pulses of magnitude $E_1$, and having a relatively short duration, T, compared to the repetition period, $1/f$. Such a pulse wave is typically of the type used in television sweep synchronization or any time reference marker. Another example of such a reference pulse wave is in navigation systems where the position of a rotating beam at true north is marked by the pulses. Usually such pulses are relatively strong in amplitude though only microseconds in duration. The other wave of Figure 1 is of amplitude $E_2$ and is alternating in character. While a sinusoidal wave form is shown, it is understood that the wave may be triangular, rectangular, or distorted with any combination of harmonic components, and it is immaterial even that the positive and negative loops be symmetrical. It is assumed, however, that the period of the wave $E_2$ is the same as that of the pulse wave $E_1$. The two waves $E_1$ and $E_2$ could, for example, be received on a common high frequency carrier as in television or navigating systems. The two waves are respectively applied to terminals 1 and 2 of the system shown in Figure 2. The phase of the alternating wave is shifted by the phase shifter 3 and applied to the phase comparator 4 where the two voltages $E_1$ and $E_2$ are combined and compared. The phase shifter may be adjusted manually, or by servo controls, the last being preferred in azimuthal indicating systems. When the desired coincidence is obtained between the pulse $E_1$ and the nodal point of the alternating wave, a zero output voltage from the comparator is indicated on the meter 5. In such a system the meter 5 would be of the zero center type to indicate either polarity and to suggest the proper adjustment of the phase shifter 3 to obtain coincidence, zero voltage, and centering of the meter. The dial of the phase shifter may be calibrated to accurately indicate the shift of the phase set into the alternating wave to accomplish this coincidence. It is apparent that the two-polarity voltage at the output of the comparator may be fed back, servo-fashion, to the adjusting shaft of the phase shifter 3 to cause the system to home on the zero voltage position represented by coincidence. Alternatively, the phase shifter 3 may be omitted and the direct current meter 5 calibrated to indicate amount and direction of the phase of $E_2$ with respect to $E_1$.

One phase comparator, 4, of this invention, is shown in detail in Figure 3.

In Figure 3 the pulse signal $E_1$ is applied to one terminal of the diode 10. While a diode of the vacuum type is illustrated it will be understood that two-terminal rectifiers of any type, such as semi-conductor rectifiers or gas tubes, may be used. Where the pulse signal $E_1$ is of the positive going type, as shown in Figure 1, terminal $E_1$ would be connected to the anode terminal 11 of the diode so that the voltage $E_1$ would encounter only the low forward resistance of the diode. The circuit for the assumed positive pulse signal is completed from the cathode terminal 12 through the load resistor 13 to ground through storage condenser 14. The output direct current signal, $E_3$, appears across condenser 14, at output terminal 19.

The alternating voltage $E_2$ is applied to the cathode 12 through a coupling device, such as condenser 15. Hence, any forward current flowing through diode 10 is proportional to the potential of the cathode 12 at the instant the anode 11 is pulsed. It follows that the voltage across diode 10 is equal to $E_1-E_2$, and that no current will flow except when $E_1$ exceeds $E_2$.

According to an important feature of this invention, the pulse information $E_1$ is also applied through a second circuit, including condenser 16 and resistor 17 to the output terminal and the storage condenser 14. Means is provided in this parallel circuit for reversing the polarity of the pulse before it is applied to the condenser 14. In the example shown, diode 18 is connected across the load resistor 17 and is polarized so that the voltage, $E_3$, at the junction of the condenser 16 and resistor 17 is negative, or opposite in polarity to $E_1$.

If the pulses are considered to start at time zero and repeat at intervals of time, $1/f$, a sine wave applied at input terminal $E_2$, may be considered to be of the form $$A \sin (2\pi ft + \alpha)$$

Then the voltage E across diode 10 at time zero, when the pulse occurs, is $$E_1 - A \sin \alpha$$

Now, for $\alpha = 0$, the voltage is $$E = E_1$$

That is, when $\alpha =$ zero, the rectified voltage at the cathode 12 will be that which is due to the pulse alone and, in the example shown, will be of positive polarity only. Now, if the resistance of resistor 13 and 17 are equal and the capacitance of condensers 15 and 16 are equal, then the potential at 12 will be equal in magnitude but opposite in polarity to the potential $-E_3$. Under these conditions the net output voltage at the output terminal 19 will be zero since it is derived from equal and opposite voltages $+E_3$ and $-E_3$.

For values of $\alpha$ from 0° to 180°, $\sin \alpha$ is positive and the amplitude of the resultant voltage E is less than when $\alpha = 0$. Therefore, the rectified voltage at cathode 12 is smaller than previously and the voltage at the cathode will be smaller in amplitude than $-E_3$. Accordingly, the voltage at the output 19 will have a net negative value depending upon the value of $\alpha$. Since the slope of a sine wave is a maximum at or near the null point of the sine wave, the detector is most sensitive at or near the nodal point, as desired.

For values of $\alpha$ from 180° to 360°, $\sin \alpha$ is negative and the amplitude of the net output voltage is more than zero. Therefore, the rectified voltage at cathode 12 will be more than $E_3$ and, consequently, the voltage at the output 19 will have a net positive value, again depending on the value of $\alpha$. This is the desired result.

Many modifications may be made in the circuits shown without departing from the basic concept of the invention as defined in the appended claims. This basic concept comprises dividing the pulse voltage between two parallel paths and recombining or adding the two pulse voltages at the output terminal of the parallel paths; in one path the polarity of the pulse voltage is reversed so that when the two voltages are combined their sum will be zero; and to the other path is added the alternating voltage to modify the pulse amplitude in this other path in accordance with the amplitude of the sine voltage at the instant of the pulse. Accordingly, the output voltage will then vary from zero and its positive or negative polarity will depend upon whether the added alternating voltage is negative or positive at the instant of the pulse. The output positive or negative voltage in turn indicates lag or lead of the sine wave with respect to the pulse wave.

It is important in the operation of this phase detector that the voltage $E_1$ be greater than the peak voltage of $E_2$. If the phase detector is to be used in the self aligning system, as in navigation receivers, $E_1$ needs to be greater than $E_2$ but not necessarily twice as great. If, however, the device is to be used for direct reading of phase, meaning that it is not operated at zero phase under normal conditions, it is necessary that $E_1$ be at least twice as great as $E_2$.

What is claimed is:

1. In a system for comparing the phase of an alternating wave with a repetitive pulse signal of the same period, two parallel circuits of substantially equal impedances joined at the input terminal and at the output terminal of the system; a source of said repetitive pulse signals connected to said input terminal, means in one circuit only for reversing the polarity of the pulse, means exclusively in the other path responsive to said alternating wave for modifying the amplitude of pulse voltage, and means coupled to said output terminal for indicating the amplitude and polarity of the resultant voltage at said output terminal.

2. A discriminator for accurately determining coincidence of phase of an alternating wave and voltage pulses of short duration and like frequency, comprising a storage condenser with one terminal connected directly to reference ground, a high impedance transmission circuit between an input terminal, adapted to receive said voltage pulses, and other terminal of said condenser; a first diode in series in said circuit, a second high impedance transmission circuit connected between said input terminal and said other terminal, means in said second transmission circuit for reversing the phase of said voltage pulses so that the net charge stored in said condenser because of pulses in said two transmission circuit is zero, means to add said alternating wave to the pulse current flowing in one of said transmission circuits to produce imbalance in pulse energy flowing to said condenser through said two transmission circuits, and voltage responsive means connected to said condenser for utilizing the resultant voltage across said condenser.

3. In combination in a system for comparing the phase of a repetitive relatively narrow pulse-type signal with a sinusoidal signal of the same frequency, the system comprising a storage condenser with one terminal connected to reference ground, a first circuit including a first diode, a pulse signal source, and a sinusoidal signal source, the sources being coupled to opposite terminals, respectively, of said first diode so that forward current through said first diode is a function of the instantaneous polarity and amplitude of one signal with respect to the other; a load resistor in series with said first diode, said load resistor and first diode being connected between the other terminal of said storage condenser and said pulse signal source, a second circuit connected between said other terminal and said pulse signal source including means for reversing the phase of said pulse signal and generating a voltage proportioned in amplitude to the amplitude of said repetitive signal and of opposite polarity at said condenser so that the net stored charge of said condenser is proportional to the phase difference of said pulses and sinusoidal signals.

4. A system for detecting coincidence of the null of a sine wave with a voltage pulse, comprising a diode with anode and cathode-type electrodes, a source of sine waves and a source of voltage pulses coupled to the cathode and anode electrodes respectively so that current through the diode is a function of the phase relation of the two voltages; a storage condenser connected in series with said diode between said pulse source and ground; means generating voltage pulses proportional in amplitude but reversed in polarity to said pulse voltage connected between said pulse source and the ungrounded terminal of said condenser for adding the generated reversed-polarity pulses to the voltage produced in said condenser by said current through the diode.

5. In combination in a system for comparing the phase of a sinusoidal wave with repetitive pulses of relatively short duration and of the frequency of said sinusoidal wave, a first and second source, respectively, of said pulses and said wave; a storage condenser, said storage condenser having one terminal connected directly to reference ground, a first diode connected between the other terminal of said storage condenser and said source of pulses to charge said storage condenser with said pulses and to prevent leakage of the charge from said condenser to said source of pulses, means coupling said source of sinusoidal waves to said first diode for modulating the amplitude of the forward pulse through said diode; a coupling condenser and a resistance connected in series between said other terminal of the storage condenser and said source of pulses, and a second diode coupled between reference ground and the junction of said coupling condenser and resistance to reverse the polarity of pulse voltages applied to said storage condenser.

References Cited in the file of this patent

UNITED STATES PATENTS

| | | |
|---|---|---|
| 2,466,959 | Moore | April 12, 1949 |
| 2,564,471 | Eaton | Aug. 14, 1951 |
| 2,564,682 | Fisk | Aug. 21, 1951 |
| 2,751,555 | Kirkpatrick | June 19, 1956 |
| 2,781,489 | Petrides | Feb. 12, 1957 |